(12) United States Patent
Desing et al.

(10) Patent No.: US 10,550,898 B2
(45) Date of Patent: Feb. 4, 2020

(54) TORQUE COUPLING SYSTEM WITH LUBRICANT MANAGEMENT

(71) Applicant: JTEKT AUTOMOTIVE NORTH AMERICA, INC., Plymouth, MI (US)

(72) Inventors: Patrick Desing, Ann Arbor, MI (US); Shun Ono, Novi, MI (US); Jeremy Grunn, Howell, MI (US); Junji Ando, Novi, MI (US); Michael Kocevar, Toledo, OH (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 176 days.

(21) Appl. No.: 15/839,135

(22) Filed: Dec. 12, 2017

(65) Prior Publication Data

US 2019/0178311 A1    Jun. 13, 2019

(51) Int. Cl.
*F16D 33/14* (2006.01)
*F16D 25/12* (2006.01)

(52) U.S. Cl.
CPC ............ *F16D 33/14* (2013.01); *F16D 25/123* (2013.01); *F16D 2300/26* (2013.01)

(58) Field of Classification Search
None
See application file for complete search history.

(56) References Cited

U.S. PATENT DOCUMENTS

| | | | | |
|---|---|---|---|---|
| 2,425,171 A | * | 8/1947 | Bennett | G01L 3/20 188/296 |
| 3,110,196 A | * | 11/1963 | Hilpert | F16D 25/123 477/55 |
| 3,366,210 A | * | 1/1968 | Webster | F16D 13/74 192/113.34 |
| 4,077,500 A | * | 3/1978 | Hickman, Sr. | B60T 1/065 188/106 P |
| 4,321,990 A | * | 3/1982 | Koch, Jr. | F16D 25/123 188/296 |
| 5,896,971 A | * | 4/1999 | Hein | F16D 13/72 192/110 B |
| 7,980,370 B2 | * | 7/2011 | Tomiyama | F16H 45/02 192/113.35 |

* cited by examiner

*Primary Examiner* — Colby M Hansen
(74) *Attorney, Agent, or Firm* — Oblon, McClelland, Maier & Neustadt, L.L.P.

(57) ABSTRACT

A torque coupling system including an input shaft, a main cam affixed to the input shaft, a clutch housing that surrounds the input shaft and provides an inter space, a scoop plate affixed to the clutch housing, an external housing that encloses the clutch housing and provides an outer space, and a main clutch that is articulable between a disconnected drive mode and a all-wheel drive mode. In the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the scoop plate rotates with the clutch housing to scoop the lubricant from the outer space to inner space through the catch tank.

20 Claims, 9 Drawing Sheets

Four-wheel mode

Two-wheel mode

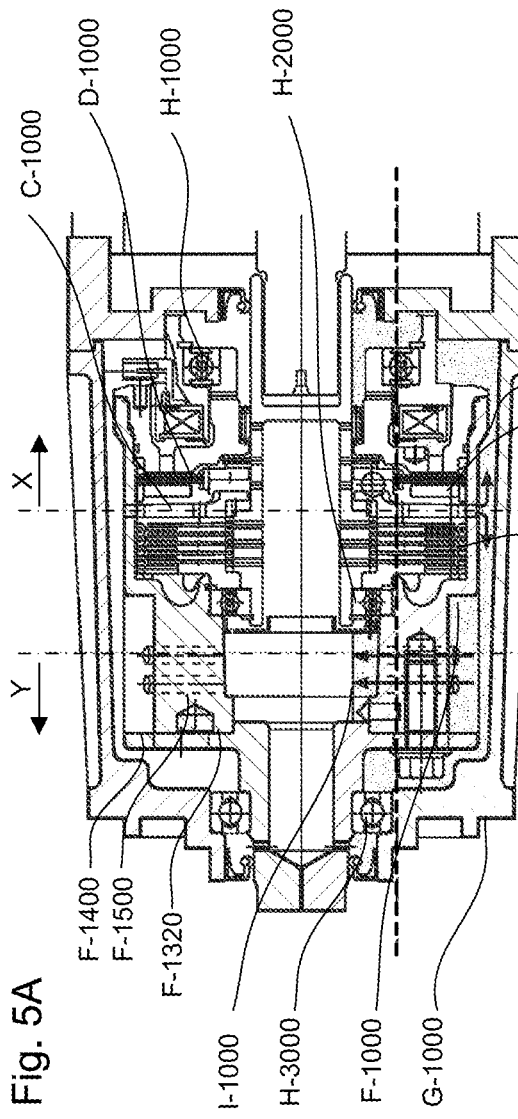
Fig. 5A
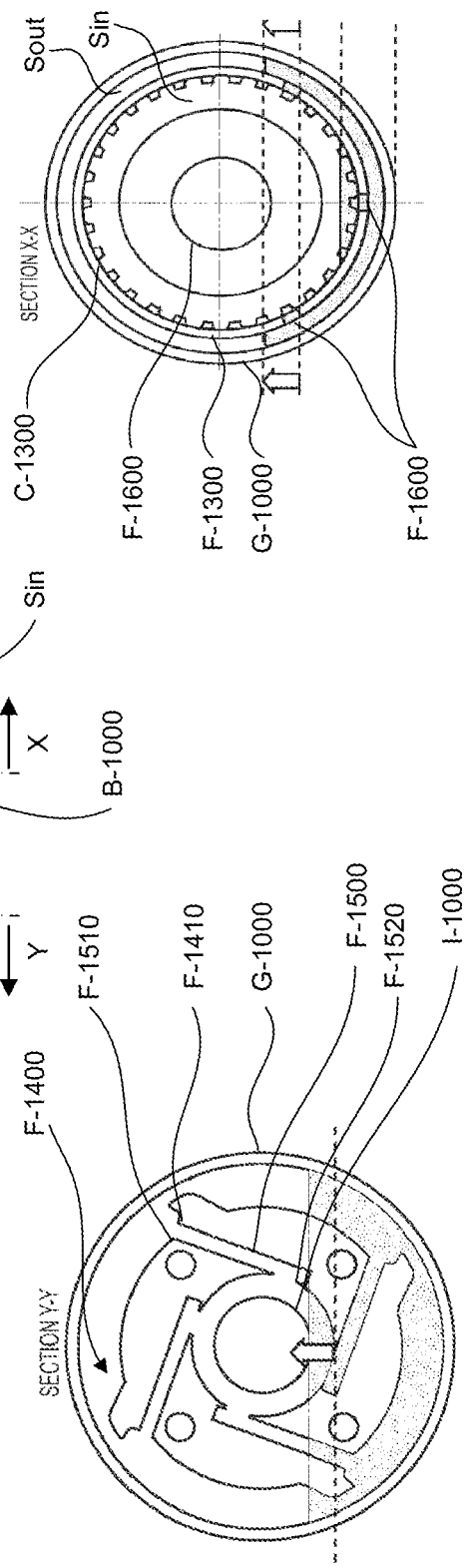
Fig. 5B
Fig. 5C

SECTION Y-Y

TORQUE COUPLING SYSTEM WITH LUBRICANT MANAGEMENT

FIELD OF THE DISCLOSURE

The present disclosure relates to torque coupling systems and notably torque controlling systems for transitioning between disconnected drive mode and all-wheel drive mode.

DESCRIPTION OF THE RELATED ART

In today's vehicles, being able to increase traction in abnormal road conditions, e.g. slippery, and/or uneven surfaces, while limiting energy consumption in normal road, e.g. even and smooth pavement, is essential.

Such a demand in traction increase and energy efficiency can be addressed by switching from a disconnected drive mode to a all-wheel drive mode when a transition between the normal and abnormal road conditions is occurring and by switching back from the all-wheel drive mode to the disconnected drive when the normal road conditions are restored.

To this end, conventional torque coupling systems that are on demand articulated to connect and disconnect secondary wheels, e.g. back wheels, to the vehicle engine, have been adopted. These conventional coupling systems can rely on, a plurality of clutches that connect and disconnect an input shaft of the engine to a propeller shaft driving the secondary wheels.

Although such conventional torque coupling systems are widely used, they present important drawbacks. Notably, in the disconnected drive mode the conventional coupling systems can experience energy loss due to interactions between rotating parts, e.g. the input shaft that is continuously rotating, and steady parts connected to the secondary wheels, e.g. the propeller shaft that stays steady.

Thus, a torque coupling system solving the aforementioned limitations of efficiency is desired.

SUMMARY

Accordingly, one object of the present disclosure is to provide a torque coupling system which overcomes the above-mentioned limitations of drag loss.

The torque coupling system of the present disclosure provides a more efficient control of the traction by displacing and/or managing lubricant present in the torque coupling system to reduce drag loss generated by interactions between moving parts and the lubricant in the disconnected drive mode while assuring adequate lubrication of the torque coupling system during the all-wheel drive mode.

In one non-limiting illustrative example, a torque coupling system is presented. The torque coupling system includes an input shaft, a main cam affixed to the input shaft, a clutch housing that surrounds the input shaft, provides an inter space between the input shaft and the clutch housing, and forms a catch tank in front of the input shaft, the clutch housing having a plurality of fins, and a plurality of channels that goes through the plurality of fins and the catch tank, an external housing that encloses the clutch housing and provides an outer space between the clutch housing and the external housing, a main clutch that is articulable between a disconnected drive mode and a all-wheel drive mode wherein, in the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the plurality of fins rotates with the clutch housing to evacuate, via the plurality of channels, the lubricant from the outer space to inner space through the catch tank.

In one non-limiting illustrative example, a torque coupling system is presented. The torque coupling, system includes an input shaft, a main cam affixed to the input shaft, a clutch housing that surrounds the input shaft and provides an inter space between the input shaft and the clutch housing a scoop plate affixed to the clutch housing, an external housing that encloses the clutch housing and provides an outer space between the clutch housing and the external housing, and a main clutch that is articulable between a disconnected drive mode and a all-wheel drive mode wherein in the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the scoop plate rotates with the clutch housing to scoop the lubricant from the outer space to inner space through the catch tank.

In one non-limiting illustrative example, a torque coupling system is presented. The torque coupling system includes an input shaft, a main cam affixed to the input shaft, a clutch housing that surrounds the input shaft, provides an inter space between the input shaft and the clutch housing, the clutch housing having a plurality of blades, and a plurality of channels that goes longitudinally through the clutch housing and opens on the inter space, an external housing that encloses the clutch housing and provides an outer space between the clutch housing and the external housing, a main clutch that is articulable between a disconnected drive mode and a all-wheel drive mode wherein, in the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the plurality of blades rotates with the clutch housing to circulate the lubricant through the plurality of channels and provide lubrication to the torque coupling system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5A is a longitudinal sectional view of the torque coupling system in the disconnected drive mode, according to certain aspects of the disclosure;

FIG. 5B is a first cross sectional view of the torque coupling system in the disconnected drive mode, according to certain aspects of the disclosure;

FIG. 5C is a second cross sectional view of the torque coupling system in a the disconnected drive mode, according to certain aspects of the disclosure;

DETAILED DESCRIPTION

Figure 1A:
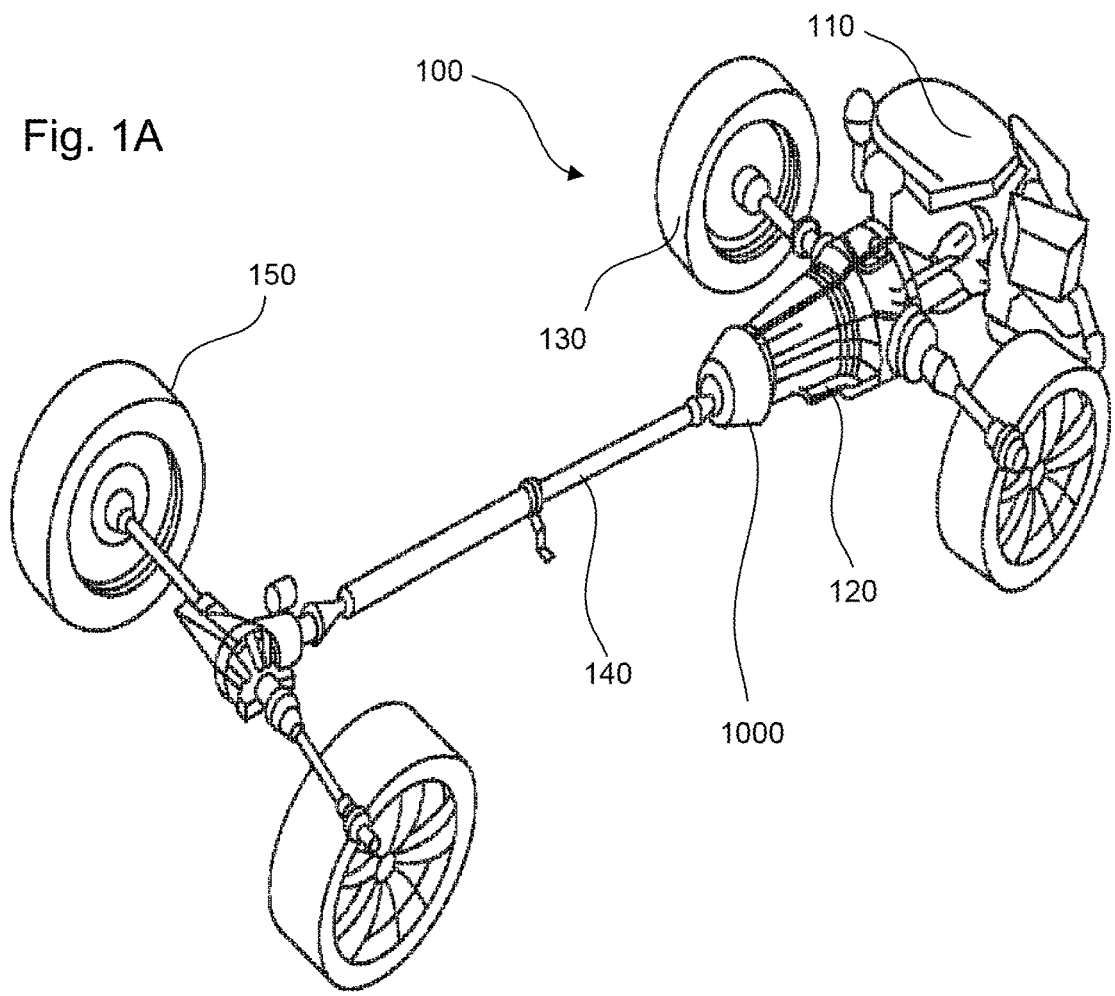
FIG. 1A is a perspective view of a power train system with a torque coupling system, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1C:
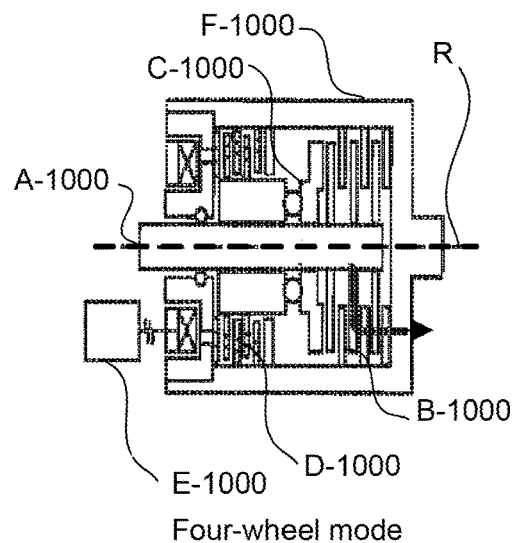
FIG. 1C is a schematic view of the torque coupling system in a all-wheel drive mode, according to certain aspects of the disclosure.
Figure 1B:
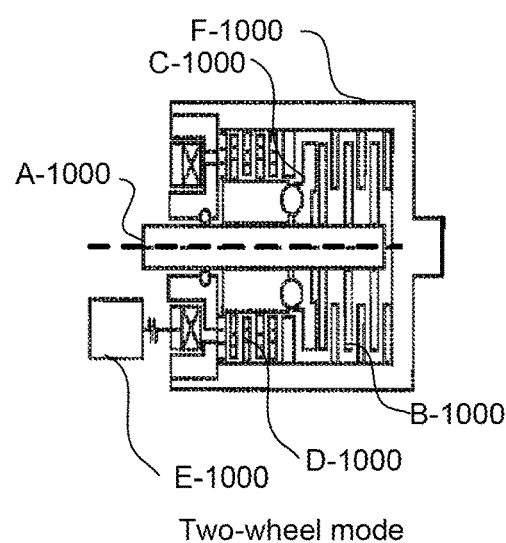
FIG. 1B is a schematic view of the torque coupling system in a disconnected drive mode, according to certain aspects of the disclosure.

FIGS. 1A-1C are a perspective view of a power train 100 with a torque coupling system 1000, a schematic view of the torque coupling system 1000 articulated in a disconnected drive mode, and a schematic view of the torque coupling system 1000 articulated in a all-wheel drive mode, according to certain aspects of the disclosure.

The power train 100 can include an engine 110, a pair of front wheels 130, a pair of back wheels 150 opposite to the pair of front wheels 130, a transmission 120 positioned between the engine 110 and the pair of front wheels 130, a torque coupling system 1000 mounted onto the transmission 120 between the pair of front wheels 130 and the pair of back wheels 150, and a propeller shaft 140 joining the pair of back wheels 150 to the torque coupling system 1000.

The torque coupling system 1000 is articulable between a disconnected drive mode, as illustrated in FIG. 1B, and a all-wheel drive mode, as illustrated in FIG. 1C. In the disconnected drive mode, the torque coupling system 1000 disconnects the pair of back wheels 150 from the transmission 120 and consequently from the engine 110, to have the traction of the power train 100 relying only on the pair of front wheels 130.

In the all-wheel drive mode, the torque coupling system 1000 connects the pair of back wheels 150 to the transmission 120 and consequently the engine 110 to have the traction of the power train 100 relying on the pair of front wheels 130 and the pair of back wheels 150.

The torque coupling system 1000 of the present disclosure provides a more efficient control of the traction by displacing and/or managing lubricant present in the torque coupling system 1000 to reduce drag loss generated by interactions between moving parts and the lubricant in the disconnected drive mode while assuring adequate lubrication of the torque coupling system 1000 during the all-wheel drive mode.

As used herein, the term "bottom" refers to the region of the torque coupling system 1000 closest to a ground surface 10 on which the pair of back wheels 150 and the pair of front wheels 130 sits, the term "top" refers to the region of the torque coupling system 1000 farthest from the ground surface 10, the term "front" refers to the region of the torque coupling system 1000 closest to the pair of front wheels 130, the term "back" refers to the region of the torque coupling system 1000 closest to the pair of back wheels 150.

The term "input" can refer to structures that receive mechanical energy, e.g. under the form of torque, from the torque coupling system 1000 while the term "output" can refer to structures that deliver mechanical energy from the torque coupling system 1000. In addition, the terms "input" and "output" can be interchanged without altering the functioning of the torque coupling system 1000.

Figure 2:
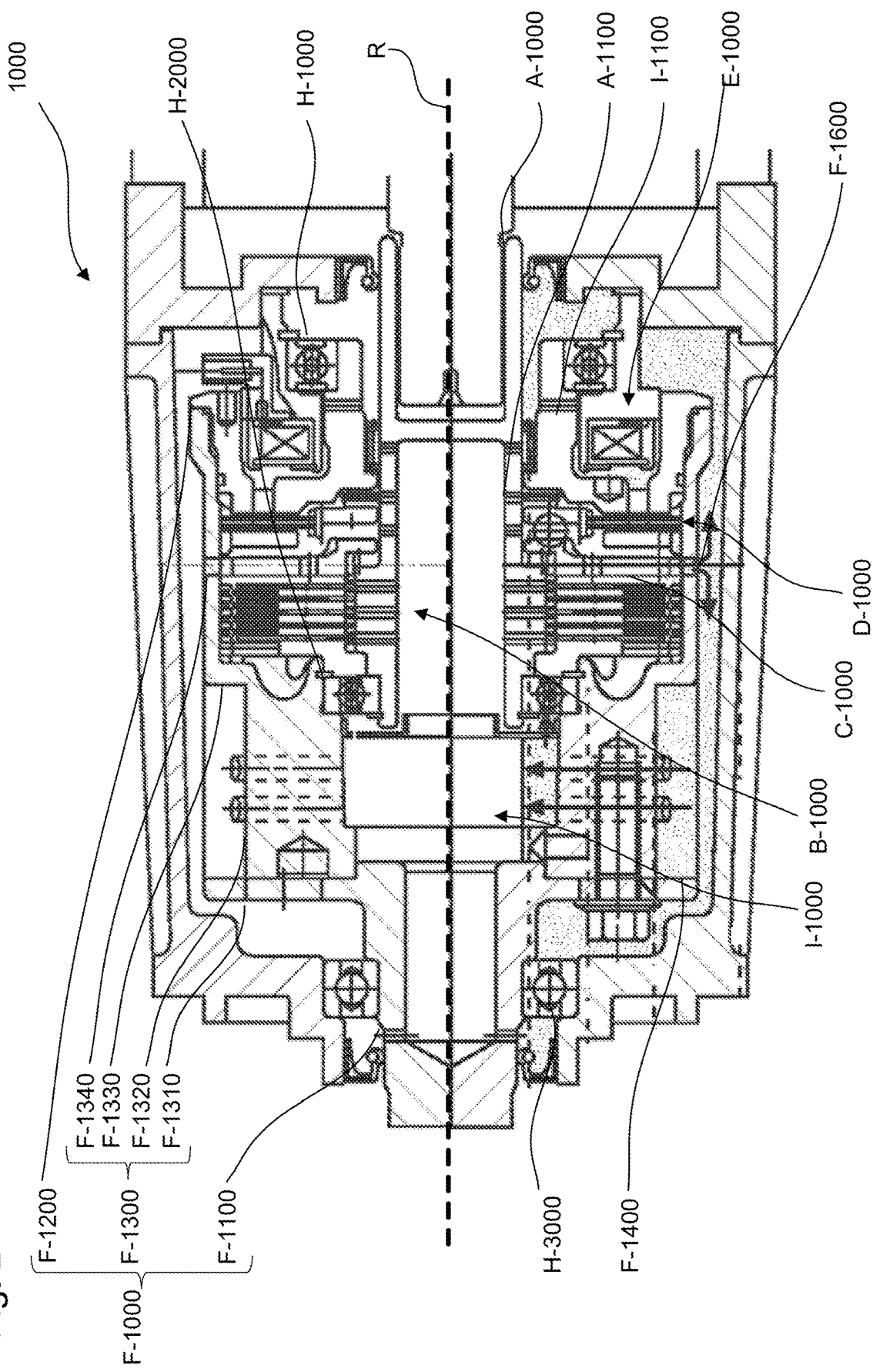
FIG. 2 is a sectional view of the torque coupling system, according to certain aspects of the disclosure.

FIG. 2 is a longitudinal sectional view of the torque coupling system 1000, according to certain aspects of the disclosure.

The torque coupling system 1000 can include an input shaft A-1000 connected to the transmission 120, see FIG. 1A, an actuation system E-1000, a clutch housing F-1000 positioned around the input shaft A-1000 and affixed to the propeller shaft 140, a middle bearing H-2000 sandwiched between the clutch housing F-1000 and the input shaft A-1000, a back bearing H-3000 sandwiched between the actuation system E-1000 and the clutch housing F-1000, a main clutch B-1000 positioned between the input shaft A-1000 and the clutch housing F-1000, a pilot clutch D-1000 positioned between the actuation system E-1000 and the main clutch B-1000, a main cam C-1000 positioned between the pilot clutch D-1000 and the main clutch B-1000 and affixed to the input shaft A-1000, an external housing G-1000 enclosing the clutch housing F-1000 and affixed to the transmission 120, and a front back bearing H-1000 sandwiched between the external housing G-1000 and the clutch housing F-1000.

To articulate the torque coupling system 1000 from the disconnected drive mode to the all-wheel drive mode, and vice-versa, the actuation system E-1000 actuates the pilot clutch D-1000 which actuates the main cam C-1000 which in turn actuates the main clutch B-1000 to provide between the input shaft A-1000 and the clutch housing F-1000 engagement, and disengagement, respectively.

In the disconnected mode, the input shaft A-1000 and the main cam C-1000 rotates while the clutch housing F-1000 stayed stationary. The rotation of the main cam C-1000 evacuates lubricant away from an inner space Sin located between the input shaft A-1000 and the clutch housing F-1000 and transfers the lubricant to an outer space Sout located between the clutch housing F-1000 and the external housing G-1000. Such an evacuation of the lubricant from the inner space Sin can reduce drag generated by the lubricant on the input shaft A-1000, the main clutch B-1000, and/or the pilot clutch D-1000 and provide a more efficient operation of the engine 110 when the torque coupling system 1000 is articulated in the disconnected mode. In addition, such a transfer of the lubricant to the outer space Sout can enhance cooling of the lubricant by increasing the contact surface between the lubricant and the external housing G-1000 which is in contact with ambient air.

In the all-wheel drive mode, the input shaft A-1000 rotates with the clutch housing F-1000. The rotation of the clutch housing F-1000 transfers back the lubricant from the outer space Sout to the inner space Sin to provide lubrication of the main clutch B-1000, the main cam C-1000, the pilot clutch D-1000, the front bearing H-1000, the middle bearing H-2000, and the back bearing H-3000.

In addition, the torque coupling system 1000 can include a catch tank I-1000 positioned around an axis R of rotation of the input shaft A-1000 and extending along the clutch housing F-1000 and the clutch housing body F-1300. The catch tank I-1000 can be opened on the main clutch B-1000, the pilot clutch D-1000, the main cam C-1000, the middle bearing H-2000 and the back bearing H-3000 through input shaft orifices A-1100 positioned radially around the input shaft A-1000, as well as on the front bearing H-1000 through clutch housing orifices I-1100 positioned radially around the clutch housing F-1000.

Figure 3:
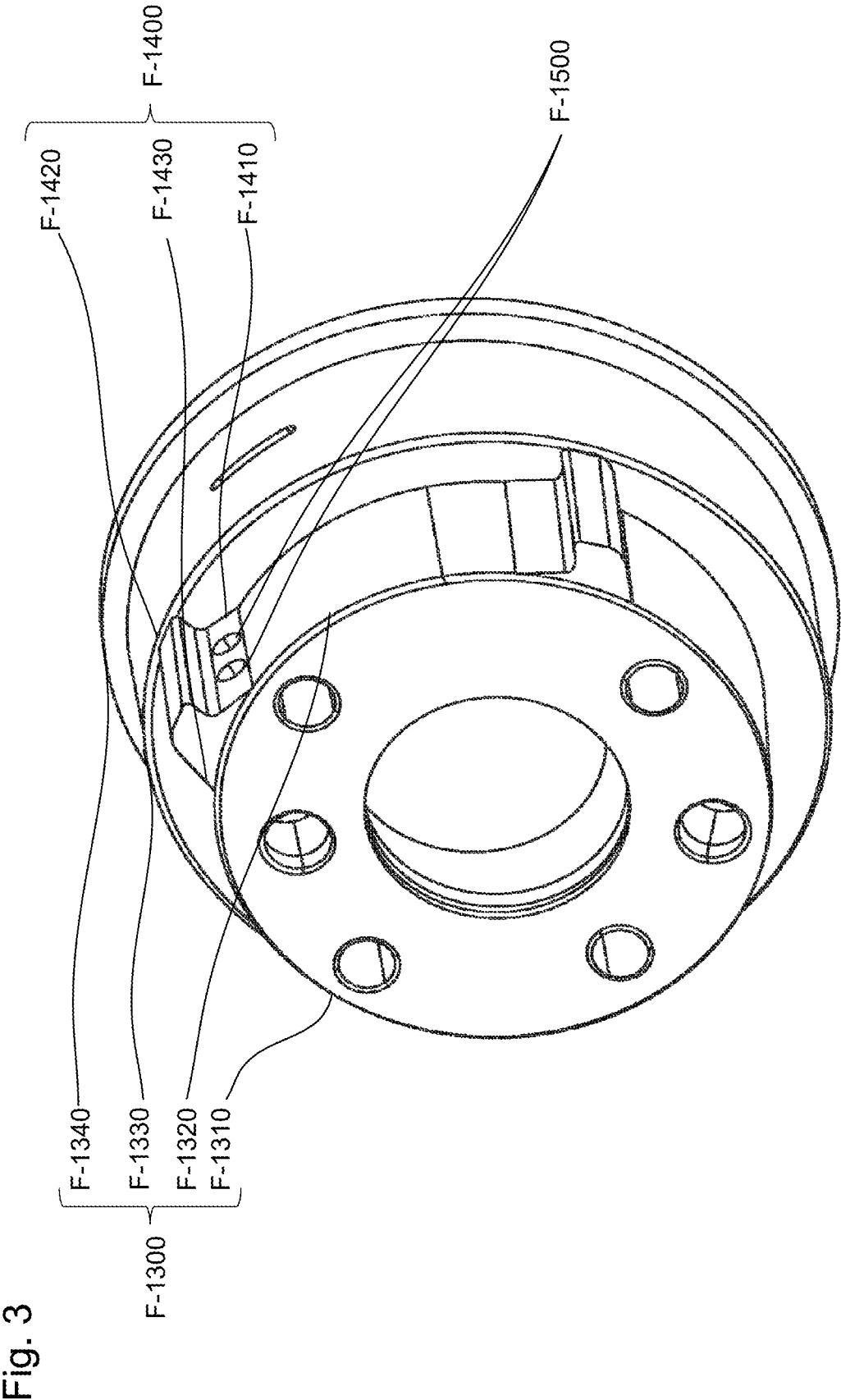
FIG. 3 is a perspective view of a clutch housing body of the torque coupling system, according to certain aspects of the disclosure.

FIG. 3 is a perspective view of a clutch housing body F-1300 of the clutch housing F-1000, according to certain aspects of the disclosure.

The clutch housing F-1000 can include a clutch housing cap F-1100 partially protruding from the external housing G-1000 to connect the propeller shaft 140, see FIGS. 1A-1C, a clutch housing shoe F-1200 enclosing the actuation system E-1000 and supporting the back bearing H-3000, and a clutch housing body F-1300 extending between the clutch housing cap F-1100 and the clutch housing shoe F-1200 to cover the input shaft A-1000, the main clutch B-1000, the main cam C-1000, and the pilot clutch D-1000.

The clutch housing body F-1300 can include a back flange F-1310 affixed to the clutch housing cap F-1100, a front flange F-1340 affixed to the clutch housing shoe F-1200, a front shoulder F-1330 extending towards the back flange F-1310 and recovering the main clutch B-1000, a back shoulder extending between the back flange F-1310 and the front shoulder F-1330, a plurality of fins F-1400 extending radially from the back shoulder F-1320, a plurality of return channels F-1500 crossing radially through the back shoulder F-1320 and the plurality of fins F-1400, and a plurality of evacuation orifices F-1600 positioned radially from the front shoulder F-1330 and facing the main cam C-1000.

Each fin of the plurality of fins F-1400 can include a fin pressure surface F-1410, a fin suction surface F-1430, and a fin leading edge F-1420 joining the fin pressure surface F-1410 and the fin suction surface F-1430. The fin pressure surface F-1410 can have a shape configured to collect the lubricant. For example, the fin pressure surface F-1410 can have concave shape.

Each return channel of the plurality of return channels F-1500 can include a channel inlet F-1510 positioned on the fin pressure surface F-1410, and a channel outlet F-1530 positioned on an internal surface of the back shoulder F-1320 of the clutch housing body F-1300 to reach the catch tank I-1000, see FIG. 2.

Figure 4B:
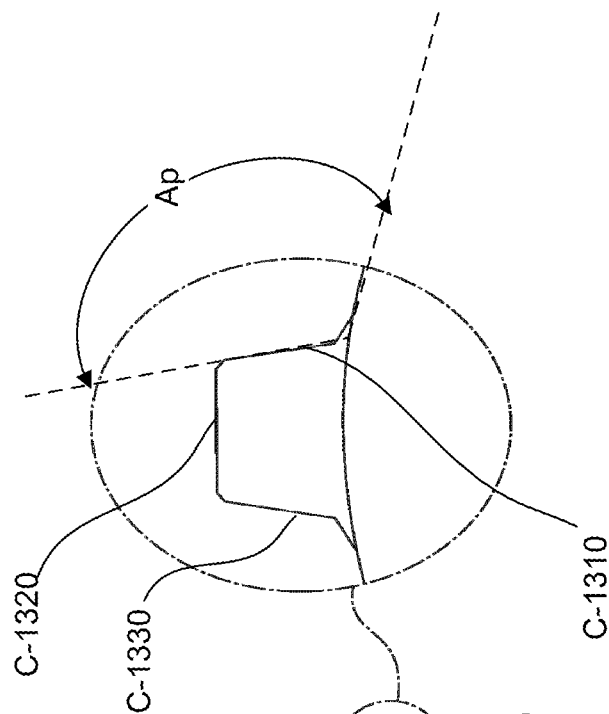
FIG. 4B is a perspective view of a paddle of the main cam, according to certain aspects of the disclosure.
Figure 4A:
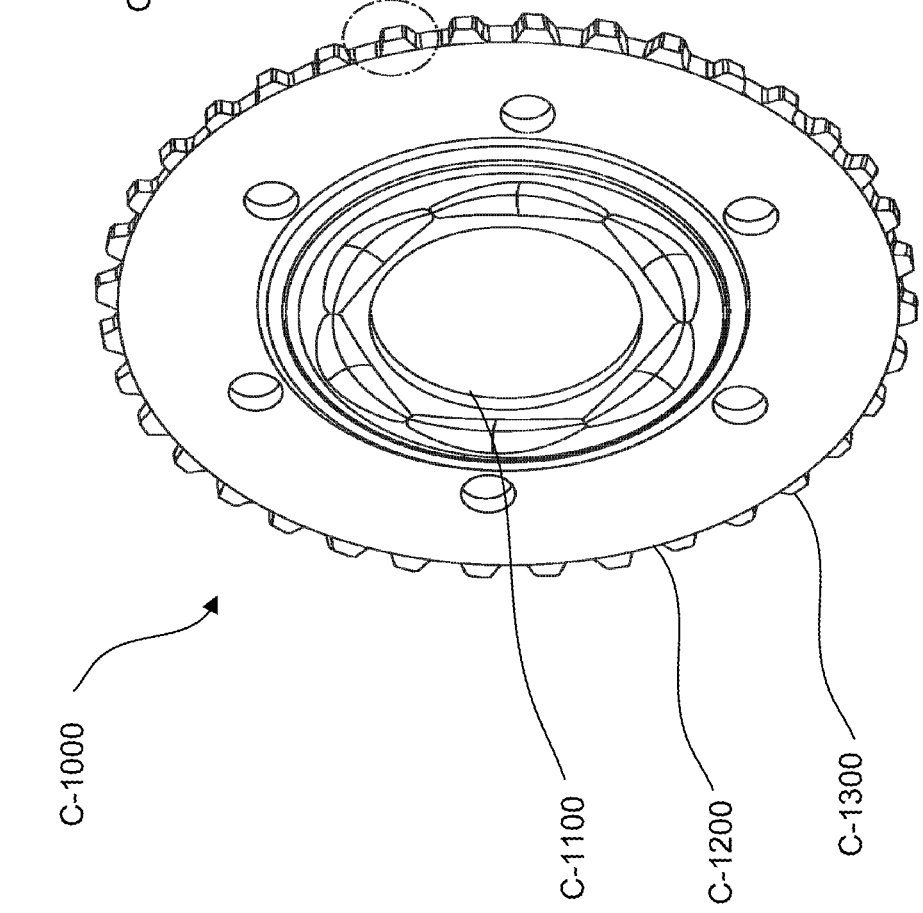
FIG. 4A is a perspective view of a main cam of the torque coupling system, according to certain aspects of the disclosure.

FIGS. 4A-4B are a perspective view of a main cam C-1000, and perspective view of a paddle C-1300 of the main cam C-1000, according to certain aspects of the disclosure.

The main cam C-1000 include a cam central portion C-1100 affixed to the input shaft A-1000, a cam peripheral portion C-1200 that surrounds the cam central portion C-1100 and a plurality of paddles C-1300 that protrudes radially from the cam peripheral portion C-1200.

Each paddle of the plurality of paddles C-1300 can include a cam pressure surface C-1310, a cam suction surface C-1330, and a cam leading edge C-1320 joining the cam suction surface C-1330 and the cam pressure surface C-1310. The cam pressure surface C-1310 can have a shape configured to push the lubricant radially from the cam peripheral portion C-1200. For example, the cam pressure surface C-1310 can be a substantially flat surface inclined from the cam peripheral portion C-1200 with a predetermined paddle angle Ap.

FIGS. 5A-5C are a longitudinal sectional view, a first cross sectional view, and a second cross sectional view of the torque coupling system 1000 in the disconnected drive mode, according to certain aspects of the disclosure.

In the disconnected drive mode, the rotation of the main cam C-1000 evacuates the lubricant from the main clutch B-1000 and the pilot clutch D-1000. The plurality of paddles C-1300 pushes the lubricant through the plurality of evacuation orifices F-1600, and forces the lubricant to flow from the inner space Sin to the outer space Sout, as well as through the back shoulder F-1320 of the clutch housing F-1000.

In addition, the external housing G-1000 and the clutch housing F-1000 can be configured to provide front and back cavities to store part of the lubricant and reduce the level of lubricant in the inner space Sin as required.

Figure 6A:
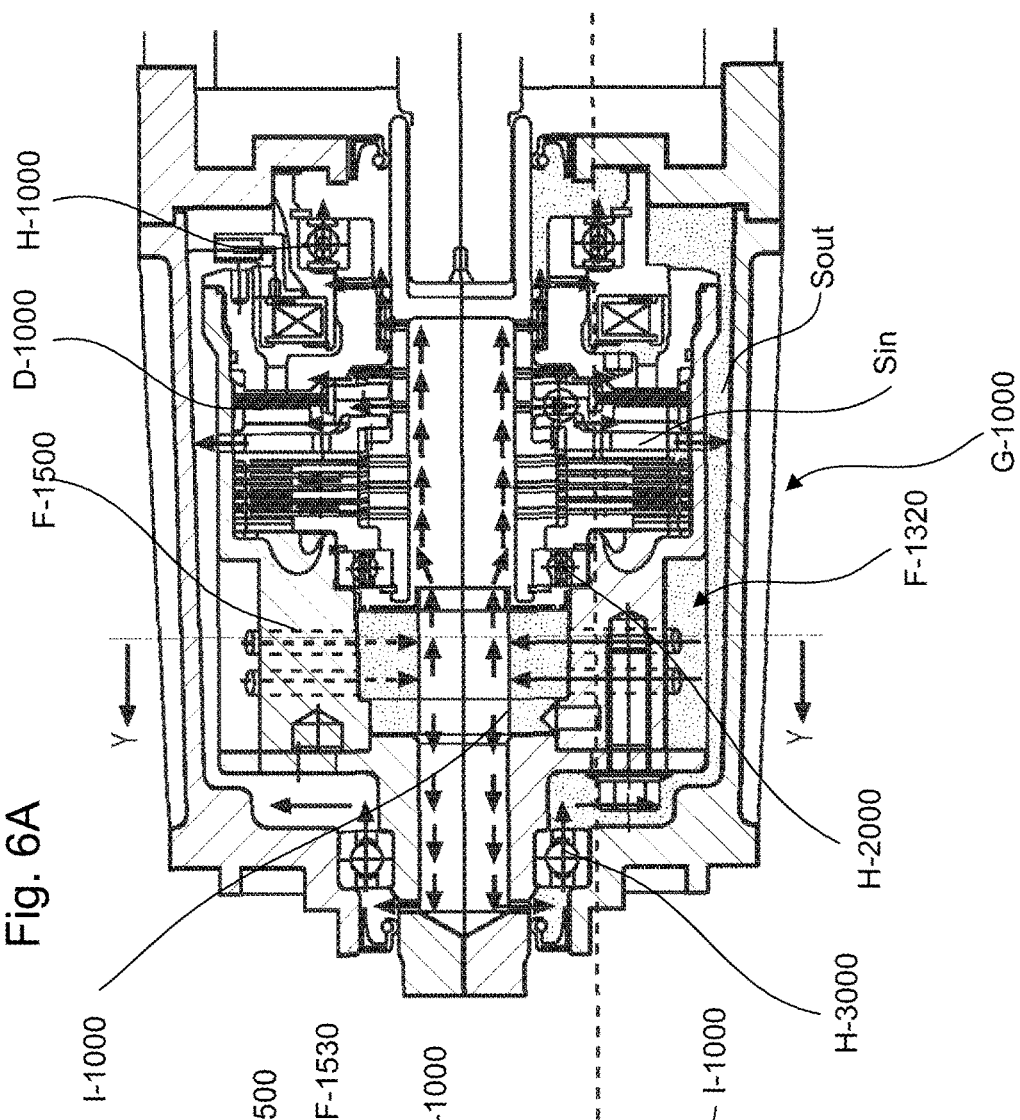
FIG. 6A is a longitudinal sectional view of the torque coupling system in a the all-wheel drive mode, according to certain aspects of the disclosure.
Figure 6B:
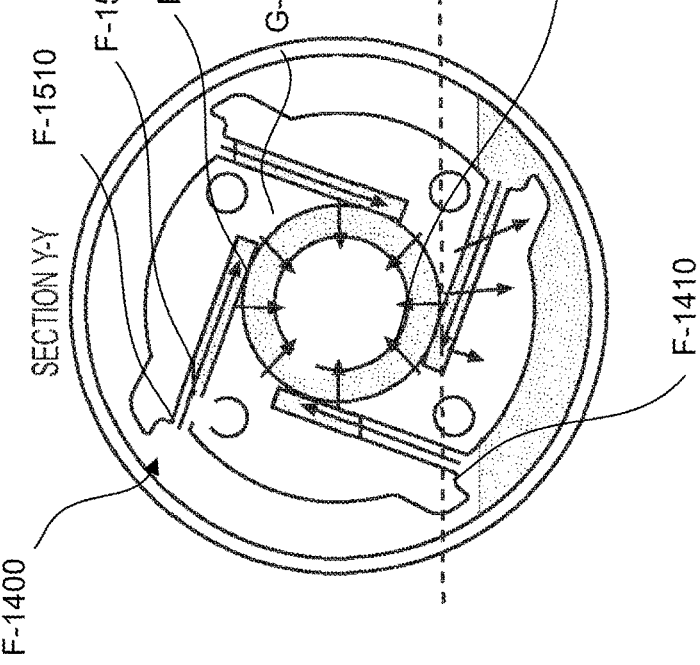
FIG. 6B is a cross sectional view of the torque coupling system in a the all-wheel drive mode, according to certain aspects of the disclosure.

FIGS. 6A-6B are a longitudinal sectional view, and a cross sectional view of the torque coupling, system 1000 in the all-wheel drive mode, according to certain aspects of the disclosure.

In the all-wheel drive mode, the rotation of the clutch housing body F-1300 distributes back the lubricant from the outer space Sout between the clutch housing F-1000 and the external housing G-1000 towards the main clutch B-1000, the main cam C-1000, and the pilot clutch D-1000. With the rotation of the clutch housing body F-1300 the plurality of fins F-1400 scoops the lubricant and generate on the lubricant a force Fc that pushes the lubricant through the plurality of return channels F-1500 from the channel inlet F-1510 to the channel outlet F-1530 and be collected in the catch tank I-1000.

From the catch tank I-1000 the lubricant is distributed to the main clutch B-1000, the pilot clutch D-1000, the main cam C-1000, the middle bearing H-2000 and the back bearing H-3000 through the input shaft orifices A-1100, as well as to the front bearing H-1000 through the clutch housing orifices I-1100.

The plurality of return channels F-1500 have geometrical characteristics, e.g. shapes, configurations, positioning, and/or dimensions, such that the force Fc overcomes centrifugal forces generated by the rotation of the clutch housing body F-1300 and assures that the lubricant flows from the channel inlet F-1510 to the channel outlet F-1530. For example, the plurality of return channels F-1500 can be pairs of parallel circular pipes that extend substantially tangentially from the catch tank I-1000.

Figure 7A:
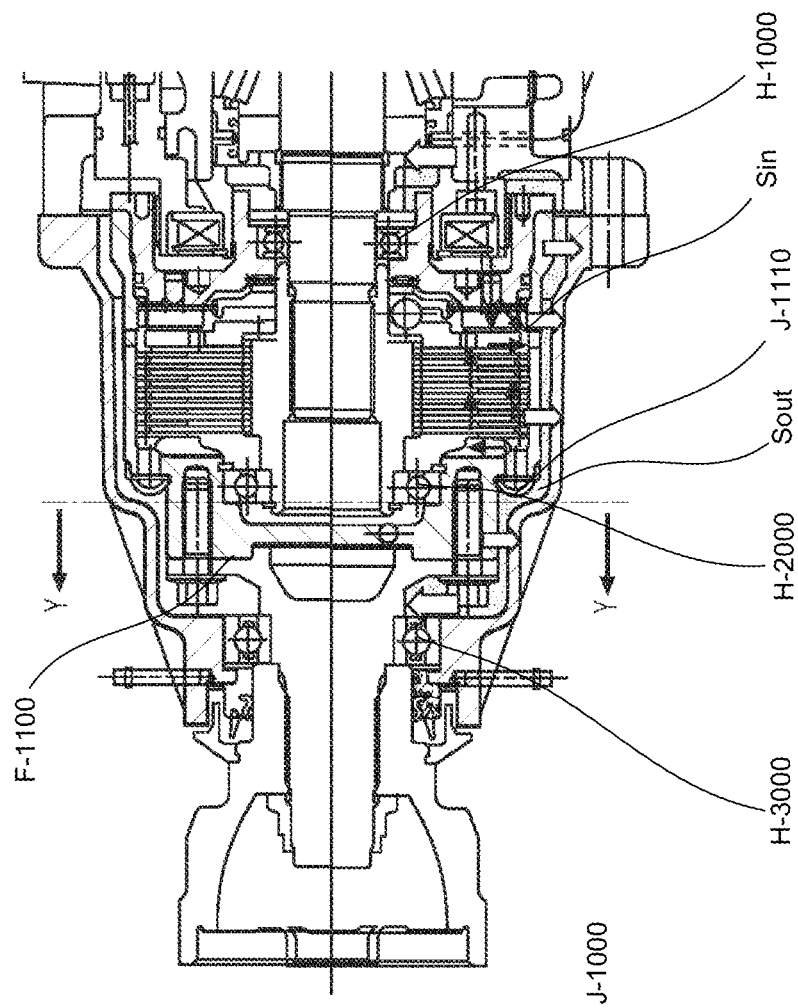
FIG. 7A is a longitudinal sectional view of the torque coupling system with a scoop plate in a the all-wheel drive mode, according to certain aspects of the disclosure.
Figure 7B:
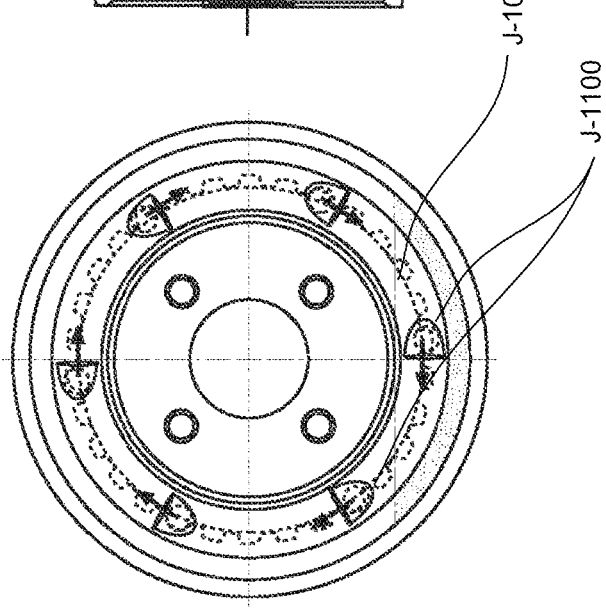
FIG. 7B is a cross sectional view of the scoop plate mounted inside the torque coupling system in the all-wheel drive mode, according to certain aspects of the disclosure.

FIGS. 7A-7B is a longitudinal sectional view of the torque coupling system 1000 and a cross sectional view of a scoop plate J-1000 mounted inside the torque coupling system 1000 in the all-wheel drive mode, according to certain aspects of the disclosure.

Alternatively, the clutch housing body F-1300 with the front shoulder F-1330 and the plurality of fins F-1400 can be replaced with a scoop plate J-1000 affixed to the clutch housing cap F-1100.

The scoop plate J-1000 can include a plurality of scoops J-1100 positioned radially around a peripheral edge of the scooper plate J-1000.

Each scoop of the plurality of scoops J-1100 can include a scoop cavity J-1110 that can be positioned adjacently to return ports I-1100, wherein the return ports I-1100 can provide communication between outer space Sout and the inner space Sin.

In the disconnected mode, the input shaft A-1000 and the main cam C-1000 rotates while the clutch housing cap F-1100 and the scoop plate J-1000 stays stationary. The rotation of the main cam C-1000 evacuates lubricant away from the inner space Sin located between the input shaft A-1000 and the clutch housing F-1000 and transfers the lubricant to the outer space Sout located between the clutch housing F-1000 and the external housing G-1000. The stationary position of the plurality of scoops J-1100 restricts the passage of the lubricant through the return ports I-1100 and prevents the lubricant from being distributed from the outer space Sout between the clutch housing F-1000 and the external housing G-1000 towards the main clutch B-1000, the main cam C-1000, and the pilot clutch D-1000.

In the all-wheel drive mode, the rotation of the clutch housing cap F-1100 distributes back the lubricant from the outer space Sout between the clutch housing F-1000 and the external housing G-1000 towards the main clutch B-1000, the main cam C-1000, and the pilot clutch D-1000. With the rotation of the clutch housing cap F-1100 the plurality of scoops J-1100 forces the lubricant through the return ports I-1100 and redistribute the lubricant from a bottom portion of the outer space Sout to the main clutch B-1000, the pilot clutch D-1000 through circumferential openings I-1200 between the clutch housing F-1000 and the external housing G-1000, the main cam C-1000, the middle bearing H-2000 and the back bearing H-3000 through the input shaft orifices A-1100, as well as to the front bearing H-1000 through the clutch housing orifices I-1100.

Figure 8A:
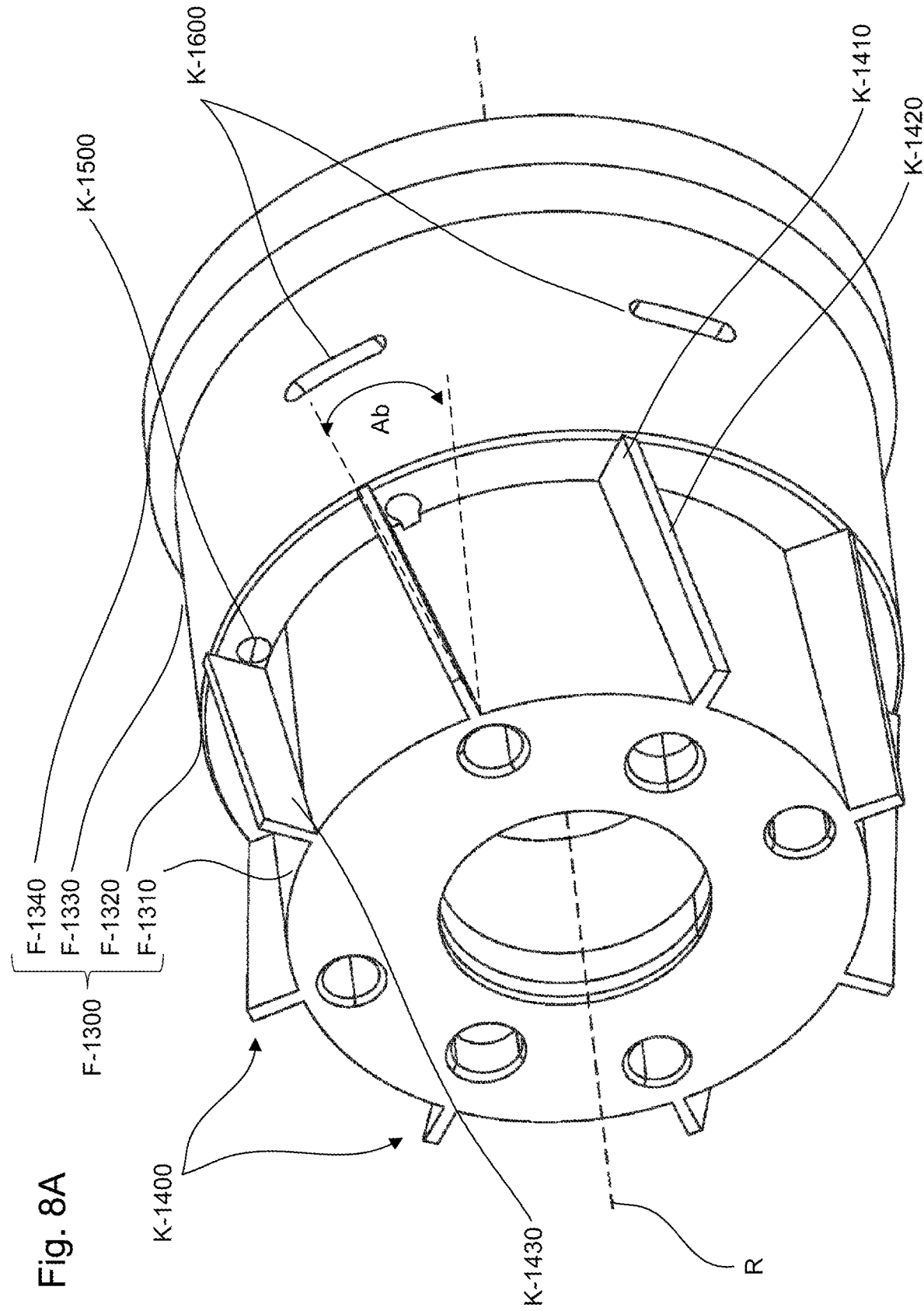
FIG. 8A is a perspective view of a clutch housing body with a plurality of blades of the torque coupling system, according to certain aspects of the disclosure.
Figures 8B, 8C:
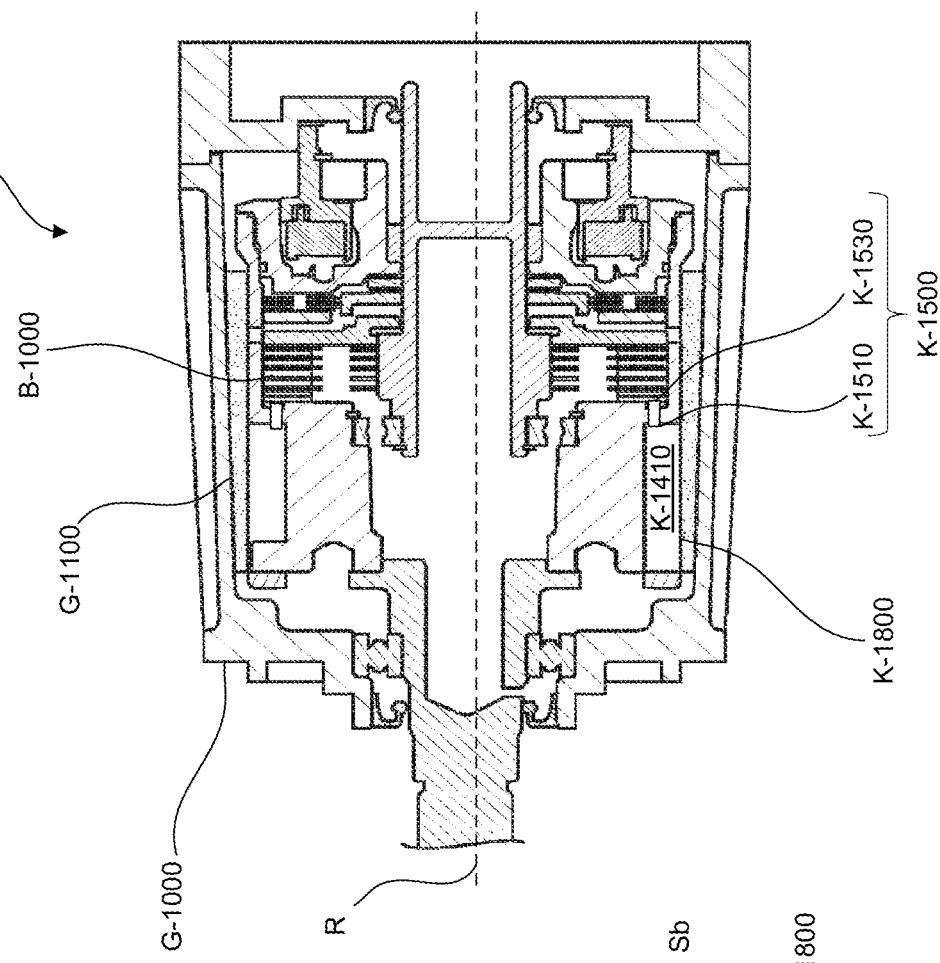
FIG. 8B is a longitudinal sectional view of the torque coupling system with the plurality of blades, according to certain aspects of the disclosure.
FIG. 8C is a cross sectional view of the torque coupling system with the plurality of blades, according to certain aspects of the disclosure.

FIGS. 8A-8C are a perspective view of the clutch housing body F-1300 with a plurality of blades K-1400, a longitudinal sectional view of the torque coupling system 1000 with the plurality of blades K-1400, and a cross sectional view of the torque coupling system 1000 with the plurality of blades K-1400, according to certain aspects of the disclosure.

Alternatively, the clutch housing body F-1300 can include a plurality of blades K-1400 instead of the plurality of fins F-1400 that extends radially from the back flange F-1310, a plurality of blade return channels K-1500, instead of the plurality of return channels F-1500, that longitudinally crosses the front shoulder F-1330, and a plurality of blade exist channels K-1600 that radially crosses the front shoulder F-1330.

Each blade of the plurality of blades K-1400 can include a blade pressure surface K-1410, a blade suction surface K-1430, and a blade leading edge K-1420 joining the blade pressure surface K-1410 and the blade suction surface K-1430. The blade pressure surface K-1410 can be configured to push the lubricant from the back flange F-1310 to the back shoulder F-1320. For example, the blade pressure surface K-1410 is substantially flat and extend obliquely from the back flange F-1310 to the back shoulder F-1320 to form a predetermined blade angle Ab with the axis of rotation R. For example, the predetermined blade angle Ab can be between 5° and 45°, and preferably between 5° and 25°.

Each blade return channel of the plurality of blade return channels K-1500 can include a blade return channel inlet F-1510 positioned adjacently to the blade pressure surface K-1410 on the back shoulder F-1320, and a blade return channel outlet K-1530 opposite to the blade return channel inlet F-1510 to face the main clutch. B-1000.

The blade exist channels K-1600 can be positioned radially around the front shoulder F-1330 and have an oblong cross section to evacuate the lubricant from the outer space Sout located between the clutch housing F-1000 and the external housing G-1000.

In the all-wheel drive mode, the rotation of the clutch housing body F-1300 distributes back the lubricant from the outer space Sout between the clutch housing F-1000 and the external housing G-1000 towards the main clutch B-1000, the main cam C-1000, and the pilot clutch D-1000. With the rotation of the clutch housing, body F-1300 the lubricant is collected by the plurality of blades K-1400, pushed along the blade pressure surface K-1410 from the back flange F-1310 to the back shoulder F-1320, and forced through the plurality of blade return channels K-1500 from the blade return channel inlets F-1510 to blade return channel outlets K-1530.

From the blade return channel outlets K-1530 the lubricant is distributed to the main clutch B-1000, the pilot clutch D-1000, the main cam C-1000, the middle bearing H-2000 and the back bearing H-3000 through the input shaft orifices A-1100, as well as to the front bearing H-1000 through the clutch housing orifices I-1100, and is redistributed to the outer space Sout between the clutch housing F-1000 and the external housing G-1000 through the plurality of blade exist channels K-1600.

In addition, a plurality of baffle plates K-1800, as illustrated in FIGS. 8B-8C, can be inserted between the blade leading edges K-1420 and an internal housing surface G-1100 of the external housing G-1000. The plurality of baffle plates K-1800 provides space reduction between the internal housing surface G-1100 and the blade leading edges K-1420 to impose on the hydraulic fluid predetermined velocity variations that increase the amount of hydraulic that is collected by the plurality of blades K-14000 and the plurality of blade return channels K-1500. For example, each baffle plate of the plurality of baffle plates K-1800 can include baffle plate ends K-1810 that forces the hydraulic fluid to slow down, as illustrated in FIGS. 8A-8C by the arrows, and generate slow moving turbulence and a baffle plate internal surface K-1820 extending between the baffle plate ends K-1810 that forces the hydraulic to accelerate along a circumference of the plurality of blades K-1400, as illustrated in FIGS. 8A-8C by the arrows.

The plurality of baffle plates K-1800 can have critical characteristics that provide circulation an amount of lubricant sufficiently important to assure adequate lubrication of the torque coupling system 1000. For example, these critical characteristics can include a spacing Sb between the baffle plate internal surface K-1820 and the blade leading edges K-1420, and/or a number of baffle plate Nb distributed around the blade leading edges K-1420. The spacing Sb can be between 0.00 mm and 10.00 mm and preferably between 0.00 mm and 5.00 mm with the number of baffle plate Nb between 1 and 10, and preferably between 1 and 6.

The foregoing discussion discloses and describes merely exemplary embodiments of an object of the present disclosure.

As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A torque coupling system comprising:
    an input shaft;
    a main cam affixed to the input shaft;
    a clutch housing that surrounds the input shaft, provides an inter space between the input shaft and the clutch housing, and forms a catch tank in front of the input shaft, the clutch housing having:
        a plurality of fins, and
        a plurality of channels that, goes through the plurality of fins and the catch tank;
    an external housing that encloses the clutch housing and provides an outer space between the clutch housing and the external housing;
    a main clutch that is articulable between a disconnected drive mode and an all-wheel drive mode wherein,
        in the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the plurality of fins rotates with the clutch housing to evacuate, via the plurality of channels, the lubricant from the outer space to inner space through the catch tank.

2. The torque coupling system of claim 1, wherein each fin of the plurality of fins include a pressure surface that scoop the lubricant.

3. The torque coupling system of claim 2, wherein the pressure surface is concave.

4. The torque coupling system of claim 3, wherein each channel of the plurality of channels has an inlet positioned on the pressure surface.

5. The torque coupling system of claim 4, wherein each channel is a circular pipe that extends substantially tangentially from the catch tank to the inlet.

6. The torque coupling system of claim 1, wherein the clutch housing includes a plurality of evacuation orifices that faces a peripheral edge of the main cam and provides passage for the lubricant between the inner space and the outer space.

7. The torque coupling system of claim 6, wherein the main cam includes a plurality of paddles that faces the plurality of evacuation orifices.

8. The torque coupling system of claim 7, wherein each paddle of the plurality of paddles a cam pressure surface that pushes the lubricant radially through the plurality of evacuation orifices.

9. The torque coupling system of claim 8, wherein the cam pressure surface is substantially flat.

10. A torque coupling system comprising:
    an input shaft;
    a main cam affixed to the input shaft;
    a clutch housing that surrounds the input shaft and provides an inter space between the input shaft and the clutch housing;
    a scoop plate affixed to the clutch housing;
    an external housing that encloses the clutch housing and provides an outer space between the clutch housing and the external housing; and
    a main clutch that is articulable between a disconnected drive mode and an all-wheel drive mode wherein,
        in the disconnected drive mode the main clutch disengages the input shaft from the clutch housing and the main cam rotates with the input shaft to transfer lubricant from the inner space to the outer space while in the all-wheel drive mode the main clutch engages the input shaft with the clutch housing and the scoop plate rotates with the clutch housing to scoop the lubricant from the outer space to inner space through the catch tank.

11. The torque coupling system of claim 10, wherein the clutch housing includes return ports that faces a peripheral edge of the scoop plate and provides passage for the lubricant between the inner space and the outer space.

12. The torque coupling system of claim 11, wherein the scoop plate includes a plurality of scoops that faces the return ports.

13. The torque coupling system of claim 12, wherein each scoop of the plurality of scoops includes a scoop cavity adjacent to the return ports.

14. The torque coupling system of claim 10, wherein the clutch housing includes a plurality of evacuation orifices that faces a peripheral edge of the main cam and provides passage for the lubricant between the inner space and the outer space.

15. The torque coupling system of claim 14, wherein the main cam includes a plurality of paddles that faces the plurality of evacuation orifices.

16. The torque coupling system of claim 15, wherein each paddle of the plurality of paddles a cam pressure surface that pushes the lubricant radially through the plurality of evacuation orifices.

17. The torque coupling system of claim 16, wherein the cam pressure surface is substantially flat.

18. A torque coupling system comprising:
    an input shaft;
    a main cam affixed to the input shaft;
    a clutch housing that surrounds the input shaft, provides an inter space between the input shaft and the clutch housing, the clutch housing having:
        a plurality of blades, and
        a plurality of channels that goes longitudinally through the clutch housing and opens on the inter space;
    an external housing that encloses the clutch housing and provides an outer space between the clutch housing and the external housing:
    a main clutch that is articulable between a disconnected drive mode and an all-wheel drive mode wherein,
        in the disconnected drive mode the main clutch disengages the input shaft from the clutch housing and the main earn rotates with the input shaft to transfer lubricant from the inner space to the outer space while in the all-wheel drive mode the main clutch engages the input shaft with the clutch housing and the plurality of blades rotates with the clutch housing to circulate the lubricant through the plurality of channels and provide lubrication to the torque coupling system.

19. The torque coupling system of claim 18, wherein each blade of the plurality of blades includes a blade pressure surface that pushes the lubricant through the plurality of channels.

20. The torque coupling system of claim 18, further including a plurality of baffle plates between the plurality of blades and an internal surface of the clutch housing to provide predetermined velocity variations of the lubricant.

* * * * *